United States Patent
Tamano et al.

(10) Patent No.: US 8,353,089 B2
(45) Date of Patent: Jan. 15, 2013

(54) METHOD FOR MANUFACTURING PASTE-TYPE ELECTRODE OF LEAD-ACID BATTERY AND APPARATUS THEREFOR

(75) Inventors: Takahiro Tamano, Mie (JP); Shuhei Ohno, Mie (JP); Toshihiko Kanazawa, Mie (JP); Toshikazu Hatakenaka, Mie (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 124 days.

(21) Appl. No.: 13/119,047

(22) PCT Filed: Jan. 27, 2011

(86) PCT No.: PCT/JP2011/051577
§ 371 (c)(1),
(2), (4) Date: Mar. 15, 2011

(87) PCT Pub. No.: WO2011/093368
PCT Pub. Date: Aug. 4, 2011

(65) Prior Publication Data
US 2012/0000070 A1    Jan. 5, 2012

(30) Foreign Application Priority Data

Jan. 27, 2010 (JP) ................. 2010-015475
Dec. 15, 2010 (JP) ................. 2010-279442

(51) Int. Cl.
*B23P 13/00*    (2006.01)
*B23P 19/00*    (2006.01)

(52) U.S. Cl. ........... 29/2; 29/592.1; 29/623.1; 29/623.3; 29/730

(58) Field of Classification Search ............. 29/2, 592.1, 29/623.1, 623.3, 730
See application file for complete search history.

(56) References Cited

U.S. PATENT DOCUMENTS

| | | | | |
|---|---|---|---|---|
| 3,859,135 A | * | 1/1975 | Roberts et al. | 141/1.1 |
| 4,429,442 A | * | 2/1984 | Thomas | 29/2 |
| 4,606,982 A | * | 8/1986 | Nelson et al. | 429/59 |
| 5,435,054 A | * | 7/1995 | Tonder et al. | 29/623.5 |
| 5,655,295 A | * | 8/1997 | Sugikawa | 29/879 |
| 6,733,547 B2 | * | 5/2004 | Ma | 29/623.5 |

FOREIGN PATENT DOCUMENTS

JP    07-245100    9/1995

(Continued)

*Primary Examiner* — Carl Arbes
(74) *Attorney, Agent, or Firm* — Antonelli, Terry, Stout & Kraus, LLP.

(57) ABSTRACT

According to the present method, a paste-type electrode of lead-acid battery in which a space in the lower surface side of an electrode is favorably filled with a paste-like active material so that inner ribs of a current collector forming a grid shape does not remain exposed. The current collector is filled with a paste-like active material to obtain an electrode when the current collector passes below a filler including a hopper for containing the paste-like active material. An electrode surface is pressed during transfer of the electrode before the fed paste-like active material is hardened. The pressing step includes: a first pressing step of intensively pressing a first area of the electrode surface located on one side in a width direction that is perpendicular to a transfer direction in which the electrode is transferred and a thickness direction of the electrode; a second pressing step of intensively pressing a second area of the electrode surface located on the other side in the width direction; and a third pressing step of pressing the first and second areas of the electrode surface over the entire width of the electrode. The first to third pressing steps are each performed at least once. The pressing step is terminated by the third pressing step.

11 Claims, 4 Drawing Sheets

FOREIGN PATENT DOCUMENTS

| | | |
|---|---|---|
| JP | 09-320574 | 12/1997 |
| JP | 2002-124252 | 4/2002 |
| JP | 2006-147338 | 6/2006 |
| JP | 2007-172881 | 7/2007 |

* cited by examiner

TRANSFER DIRECTION

ELECTRODE LATERAL DIRECTION

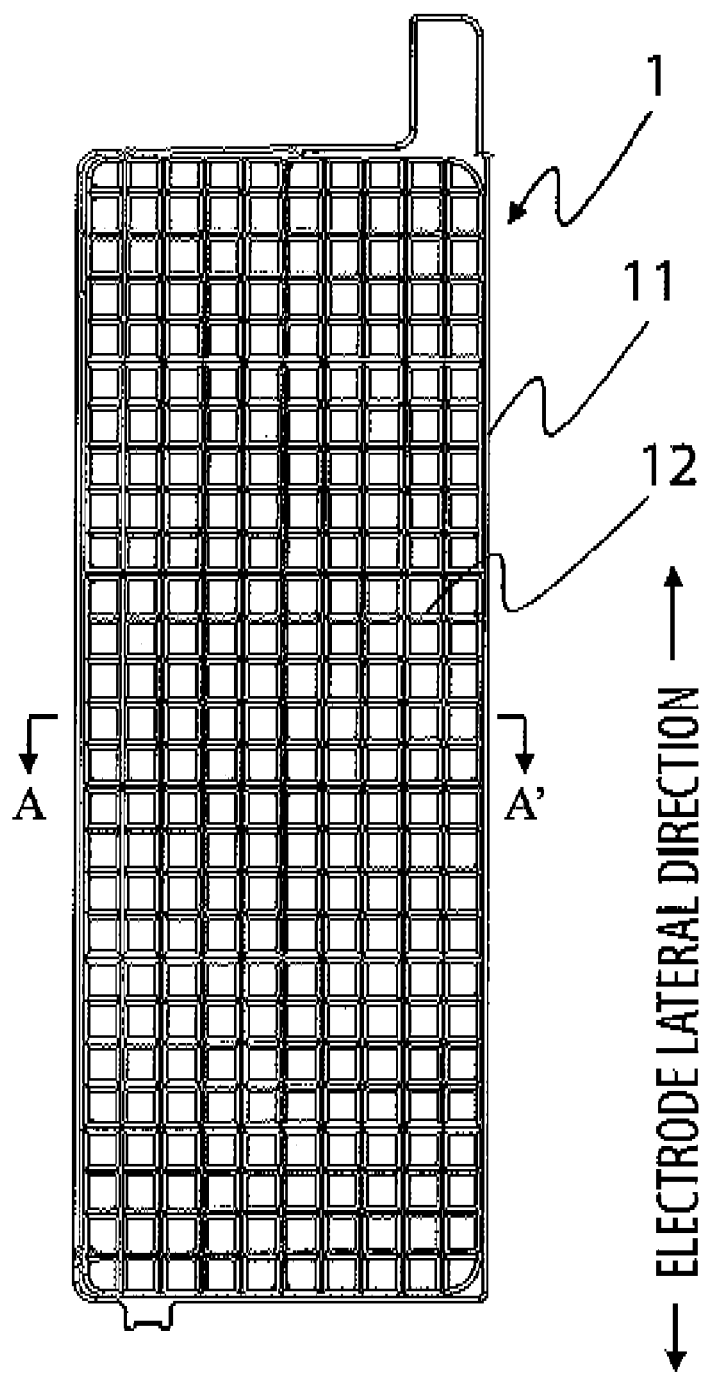

METHOD FOR MANUFACTURING PASTE-TYPE ELECTRODE OF LEAD-ACID BATTERY AND APPARATUS THEREFOR

TECHNICAL FIELD

The present invention relates to a method for manufacturing a paste-type electrode of lead-acid battery and an apparatus for use in the manufacture of the paste-type electrode of lead-acid battery.

BACKGROUND ART

A conventional paste-type electrode of lead-acid battery is manufactured as follows.

First, an active material containing lead powder as its main component and other required components is kneaded with dilute sulfuric acid or water to prepare a paste-like active material. Then, a current collector made of a lead alloy and having a grid shape is filled with the prepared paste-like active material to obtain a filled electrode. An electrode surface of the filled electrode is pressed to enhance the filling performance of the paste-like active material. After the pressing, the filled electrode is dried. The current collector has relatively thick frame ribs and relatively thin inner ribs unitarily disposed inside the frame ribs to form a grid shape.

Various processes of filling the current collector with the paste-like active material and pressing the electrode surface have been proposed in the related art.

For example, Japanese Patent Application Publication No. 07-245100 (Patent Document 1) discloses a technique in which a current collector placed on a belt conveyor is sequentially transferred and filled with a paste-like active material when the current collector passes below a hopper containing the paste-like active material to fabricate a filled electrode. Then, the filled electrode is caused to pass through a forming roller apparatus, which presses an electrode surface of the filled electrode with a uniform pressure to manufacture an electrode with little fluctuation in thickness. In order to press the electrode surface with a uniform pressure, it is necessary to apply an equal pressure (press load) to both the left and right ends of a forming roller (in the axial direction of the forming roller). Thus, in the technique disclosed in Patent Document 1 discussed above, in order to equalize the pressures respectively applied to both the left and right ends of the forming roller, the forming roller is pressed by one or two cylinders that are actuated by a common pressure.

Japanese Patent Application Publication No. 09-320574 (Patent Document 2) discloses disposing a back-spread improving roller between a belt conveyor and a forming roller to cause a paste-like active material to be sufficiently spread to the lower surface side (opposite to the side of the filled surface to which the paste-like active material is fed) of a current collector. The back-spread improving roller has a hard net on its peripheral surface. The upper surface of the net is covered with a thin fabric or a thin film. When an electrode passes through the back-spread improving roller, the net supports the current collector so that a gap is formed between the current collector and the back-spread improving roller. As a result, the paste-like active material fed to the current collector is pressed into the gap, which deforms the thin film covering the net and, at the same time, fills a space created by the deformation of the thin film with the paste-like active material. Then, the paste-like active material is pressed into a space between the lower surface of inner ribs of the current collector and the back-spread improving roller, which fills a space on the lower surface of the current collector with the paste-like active material. As a result, an electrode in which the inner ribs of the current collector are not exposed to the lower surface side of the current collector is manufactured.

RELATED-ART DOCUMENT

Patent Document

[Patent Document 1] Japanese Patent Application Publication No. 07-245100
[Patent Document 2] Japanese Patent Application Publication No. 09-320574

DISCLOSURE OF INVENTION

Technical Problem

The technique according to Patent Document 1 is effective in uniformly pressing the electrode to suppress fluctuations in thickness of the electrode. However, the technique according to Patent Document 1 may not necessarily ensure that a space on the lower surface side (opposite to the side of the filled surface to which the paste-like active material is fed) of the electrode is reliably filled with the paste-like active material. In the technique according to Patent Document 2, since the current collector is supported by the hard net, the inner ribs of the current collector may be deformed. In addition, because the hard net may not necessarily be disposed at a location at which it supports the inner ribs of the current collector, the hard net may hinder the paste-like active material from filling a space on the lower surface side of the electrode. Moreover, at the location at which the hard net supports the inner ribs of the current collector, the inner ribs of the current collector may be exposed when the hard net is removed.

An object of the present invention is to manufacture a paste-type electrode of lead-acid battery in which a space on the lower surface side of an electrode is favorably filled with a paste-like active material so that an inner rib does not remain exposed.

Another object of the present invention is to provide an apparatus for use in the manufacture of the paste-type electrode of lead-acid battery.

Solution to Problem

In order to resolve the foregoing issues, the present invention provides a manufacturing method including the step of filling a current collector with a paste-like active material to obtain a filled electrode when the current collector passes below a filler including a hopper for containing the paste-like active material. The manufacturing method of the present invention also includes the step of thereafter pressing an electrode surface of the filled electrode during transfer of the filled electrode before the fed paste-like active material is hardened. The electrode surface as used herein includes both the filled surface which faces the hopper and to which the paste-like active material is fed from the hopper and the lower surface of the electrode which is opposite to the filled surface in the thickness direction. After the pressing, the filled electrode is dried as a matter of course. In the method according to the present invention, in particular, the pressing step includes: a first pressing step of intensively (mainly) pressing a first area of the electrode surface located on one side in a width direction that is perpendicular to a transfer direction in which the filled electrode is transferred and a perpendicular direction that is perpendicular to the electrode surface; a second pressing step of intensively (mainly) pressing a second area of the electrode surface located on the other side in the width direction; and a third pressing step of pressing the first and second areas of the electrode surface over the entire width of the filled electrode. The first to third pressing steps are each performed at least once. The pressing step is terminated by the third pressing step.

In the first and second pressing steps described above, the paste-like active material, which has not been hardened yet, flows from the area which is intensively pressed toward the area which is not intensively pressed in the first and second areas arranged in the width direction of the filled electrode. Then, in the third pressing step, the paste-like active material flows such that the amount of the paste-like active material on the filled electrode becomes substantially equal over the entire width of the filled electrode. By performing the first to third pressing steps at least once each with the third pressing step performed at the end, the paste-like active material flows such that the inner rib of the current collector is not exposed but covered with the paste-like active material on the lower surface side (opposite to the side of the filled surface to which the paste-like active material is fed) of the electrode. In particular, in the case where at least an end surface of the inner rib in a thickness direction that does not face the filler is located more inward than an imaginary plane including an end surface of the frame rib in the thickness direction that does not face the filler, the effect is further positive.

In the manufacturing method according to the present invention described above, the press load on the first area may be higher than the press load on the second area in the first pressing step, and the press load on the second area may be higher than the press load on the first area in the second pressing step. In addition, the press loads on the first and second areas may be equal to each other in the third pressing step. The press loads may be set as desired in accordance with the viscosity of the paste-like active material. The difference between the press load applied in pressing the first area and the press load applied in pressing the second area may be determined as desired as long as part of the paste-like active material flows toward the second area when the first area is pressed and part of the paste-like active material flows toward the first area when the second area is pressed.

The first to third pressing steps may be respectively performed by first to third forming roller apparatuses each including a pair of rollers disposed to interpose the filled electrode in the perpendicular direction, which is perpendicular to the transfer direction in which the filled electrode is transferred, and to transfer the filled electrode in the transfer direction. In this case, the first forming roller apparatus is preferably configured such that the gap between the pair of rollers becomes gradually wider from the first area toward the second area of the electrode surface. In addition, the second forming roller apparatus is preferably configured such that the gap between the pair of rollers becomes gradually narrower from the first area toward the second area of the electrode surface. Further, the third forming roller apparatus is preferably configured such that the gap between the pair of rollers is constant. The use of the thus configured forming roller apparatuses makes it possible to gradually vary the press loads and thus to cause the paste-like active material to smoothly flow.

The following effects are obtained by controlling the loads such that a maximum press load (a high load which includes the maximum press load that may be applied by the forming roller apparatus used) is applied to the area which is intensively pressed and a zero press load (a low load which includes the minimum press load that may be applied by the forming roller apparatus used) is applied to the area which is not intensively pressed. That is, it is possible to enhance the fluidability of the paste-like active material to the maximum, which further facilitates covering the inner rib of the current collector with the paste-like active material on the lower surface side of the electrode.

The present invention also provides an apparatus for manufacturing a paste-type electrode of lead-acid battery, including: a belt conveyor that sequentially transfers a current collector placed thereon; a filler including a hopper for containing a paste-like active material to fill the current collector that passes below the filler with the paste-like active material to provide a filled electrode; and a pressing apparatus disposed behind the belt conveyor in a transfer direction in which the belt conveyor transfers the filled electrode to press an electrode surface of the filled electrode. The pressing apparatus includes: at least one first forming roller apparatus that intensively presses a first area of the electrode surface located on one side in a width direction that is perpendicular to the transfer direction and a perpendicular direction that is perpendicular to the electrode surface; at least one second forming roller apparatus that intensively presses a second area of the electrode surface located on the other side in the width direction; and at least one third forming roller apparatus that presses the first and second areas of the electrode surface over the entire width of the filled electrode. The third forming roller apparatus is disposed at the end of a row of the first to third forming roller apparatuses arranged in the transfer direction.

The first to third forming roller apparatuses may each include a pair of rollers disposed to interpose the filled electrode in the perpendicular direction and to transfer the filled electrode in the transfer direction. In this case, the first forming roller apparatus may be configured such that the gap between the pair of rollers becomes gradually wider from the first area toward the second area of the electrode surface. The second forming roller apparatus may be configured such that the gap between the pair of rollers becomes gradually narrower from the first area toward the second area of the electrode surface. The third forming roller apparatus may be configured such that the gap between the pair of rollers is constant.

Preferably, an outer peripheral portion of at least one roller in the pair of rollers forming each of the first to third forming roller apparatuses is formed by an elastic material, the at least one roller contacting an electrode surface of the filled electrode that faces the filler (that is, the filled surface). With such a configuration, the outer peripheral portion of the at least one roller on the side of the intensively pressed area is more or less deformed by a pressure applied when the roller contacts the filled surface of the electrode. When contacted by the outer peripheral portion of the at least one roller, the paste-like active material is squeezed or forced from the filled surface toward the opposite surface. In the first and second forming roller apparatuses, the paste-like active material, which has not been hardened yet, flows from the area which is intensively pressed toward the area which is not intensively pressed in the first and second areas arranged in the width direction of the filled electrode. Then, in the third forming roller apparatus, the paste-like active material flows such that the amount of the paste-like active material on the filled electrode becomes substantially equal over the entire width of the filled electrode. Consequently, the paste-like active material flows such that the inner rib of the current collector is not exposed but covered with the paste-like active material on the lower surface side of the electrode.

The first to third forming roller apparatuses may each include a load control device. The load control device may controllably apply a load in a direction toward the filled electrode to each of ends of a rotary shaft of the at least one roller. Specifically, the load control device of the first forming roller apparatus may control the loads such that the load applied to the end of the rotary shaft located on the first area side is higher than the load applied to the end of the rotary shaft located on the second area side. The load control device of the second forming roller apparatus may control the loads such that the load applied to the end of the rotary shaft located on the second area side is higher than the load applied to the end of the rotary shaft located on the first area side. The load control device of the third forming roller apparatus may control the loads such that the loads applied to both of the ends of the rotary shaft are equal to each other.

For example, the load control device of each of the first and second forming roller apparatuses may control the loads such that a maximum load is applied to one of the ends of the rotary shaft and a minimum load is applied to the other of the ends of the rotary shaft. In this case, the load control device of the third forming roller apparatus may control the loads such that a maximum load is applied to each of the ends of the rotary shaft.

Controlling the press loads in this way enhances the flowability of the paste-like active material. This facilitates covering the inner rib included in the current collector with the paste-like active material on the lower surface side of the electrode.

The pair of rollers apply a pressure not only to the paste-like active material but also to the current collector. When a pressure is applied to the current collector, the current collector may be deformed. Thus, the outer peripheral portion of the other roller in the pair of rollers of each of the first to third forming roller apparatuses may also be formed by an elastic material. In this case, the hardness of the outer peripheral portion of the one roller is preferably lower than the hardness of the outer peripheral portion of the other roller.

With such a configuration, a portion of the one roller that contacts the current collector is concavely deformed by a pressure applied when the portion contacts the filled surface of the electrode, and the remaining portion of the one roller is projected inwardly of an area defined by the frame rib and the inner rib of the current collector. Therefore, the paste-like active material is squeezed or forced from the filled surface toward the lower surface of the electrode. Thus, it is possible to cause the paste-like active material fed from the upper surface of the electrode to flow to the lower surface of the electrode.

The elastic material forming the outer peripheral portion of the one roller preferably has a thickness of 40 mm or more. If the elastic material forming the outer peripheral portion of the one roller is too thin, only a small pressing force is applied to the paste-like active material. Thus, with the elastic material having a thickness of 40 mm or more, a sufficient pressing force may be provided.

BRIEF DESCRIPTION OF DRAWINGS

FIG. 2 is a plan view of a current collector to be processed into an electrode of lead-acid battery.

BEST MODE FOR CARRYING OUT THE INVENTION

Figure 1:
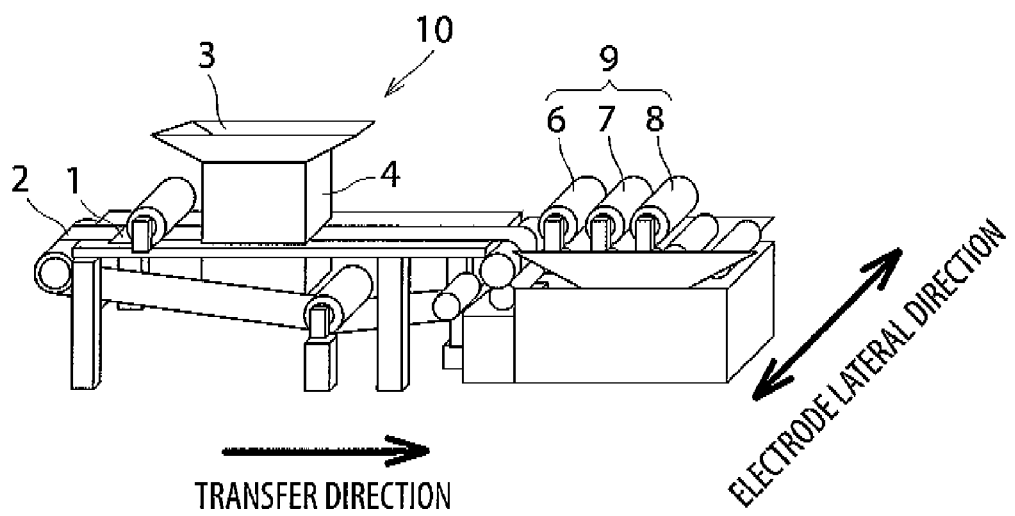
FIG. 1 is a perspective view showing a manufacturing apparatus according to an embodiment of the present invention.

A preferred embodiment of the present invention will be described in detail below with reference to the drawings. FIG. 1 schematically shows an apparatus 10 for manufacturing a paste-type electrode of lead-acid battery according to the embodiment. The manufacturing apparatus 10 includes a belt conveyor 2 that transfers a current collector 1, a filler 4 including a hopper 3 containing a paste-like active material, and a pressing apparatus 9. The pressing apparatus 9 includes a first forming roller apparatus 6, a second forming roller apparatus 7, and a third forming roller apparatus 8.

The current collector 1 used in the embodiment is made from a lead alloy which contains lead as its main raw material as well as tin, calcium, antimony, sodium, or the like. It is preferable that the lead alloy contains both tin and calcium. This is because addition of calcium reduces the rate of self-discharge. However, addition of calcium tends to corrode the current collector. Addition of tin suppresses corrosion of the current collector.

FIG. 2 is a plan view of the current collector 1 used in the embodiment. The current collector 1 is formed by relatively thick frame rib 11 having a rectangular shape and inner ribs 12 that are relatively thinner than the frame rib 11 and that are unitarily disposed inside the frame rib 11 to form a grid shape. The cross-sectional shapes of the frame rib 11 and the inner ribs 12 are not specifically limited, but are preferably such that the frame rib 11 and the inner ribs 12 contact the paste-like active material over a wide area and such that the paste-like active material is easily filled around the frame rib 11 and the inner ribs 12. More specifically, the frame rib 11 and the inner rib 12 may each have a diamond-like or hexagonal cross-sectional shape that is longer in the thickness direction. Although the cross-sectional shape and the dimensions of the frame rib 11 and the inner rib 12 are not limited to those of the embodiment, it is preferable that at least end surfaces of the inner ribs 12 in the thickness direction that do not face the filler 4 should be determined to be located more inward than an imaginary plane including end surface of the frame rib 11 in the thickness direction that do not face the filler 4.

The current collector 1 may be manufactured by a gravity die casting (GDC) process, a continuous casting process, an expansion process, a punching process, or the like. The current collector 1 according to the embodiment is manufactured by the gravity die casting process. In the gravity die casting process, there is no theoretical limit to the thickness of grid ribs to be cast. In addition, the gravity die casting process facilitates the manufacture of a current collector with both thick inner ribs and thin inner ribs, which provides the current collector with excellent current collecting properties and corrosion resistance.

More specifically, the gravity die casting process is a casting process including melting a metal (alloy) as a raw material of the current collector and pouring the molten raw material metal (alloy) into a die that can withstand the temperature of the molten metal by gravity.

The paste-like active material used in the embodiment is fed to and held by the current collector. The preparation of the paste-like active material is not specifically limited. For example, a paste-like active material fabricated by kneading lead powder containing lead monoxide, water, sulfuric acid, and so forth (occasionally with additives such as cut carbon fiber pieces, carbon powder, lignin, barium sulfate, and red lead depending on the properties of positive and negative electrodes) may be used. The amount of the paste-like active material fed to the current collector may be such that the inner ribs are completely buried, and is desirably such that the thickness of the paste-like active material reaches the thickness of the frame rib or more.

A plurality of current collectors 1 are placed on the belt conveyor 2 to be sequentially transferred to the filler 4. The filler 4 including the hopper 3 containing the paste-like active material fills the current collector 1 with the paste-like active material to obtain a filled electrode 5 when the current collector 1 passes below the filler 4. As shown in FIG. 1 of Patent Document 2, for example, the filler 4 may discharge the paste-like active material downward using a pair of pressing rollers that rotate in a different direction each other to fill the current collector 1 with the paste-like active material when the current collector 1 passes below the filler 4. The specific configuration of the filler 4 is not relevant to the gist of the present invention, and thus is not described here.

The filled electrode 5 obtained by filling the current collector 1 with the paste-like active material is transferred to the pressing apparatus 9 which performs a pressing process. The pressing apparatus 9 according to the embodiment includes one first forming roller apparatus 6, one second forming roller apparatus 7, and one third forming roller apparatus 8. The third forming roller apparatus 8 is disposed at the end of a row of the first to third forming roller apparatuses 6 to 8 arranged in the transfer direction. If there are a plurality of the respective forming roller apparatuses, the third forming roller apparatus 8 is disposed at the end of the row.

Figure 3A:
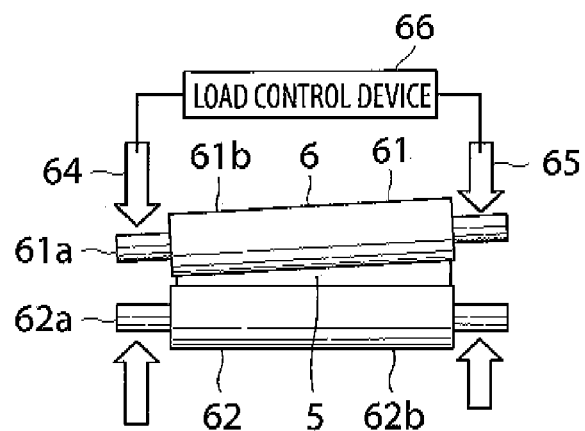
FIG. 3A schematically shows a first forming roller apparatus, FIG. 3B schematically shows a second forming roller apparatus, and FIG. 3C schematically shows a third forming roller apparatus.

FIG. 3A schematically shows the configuration of the first forming roller apparatus 6. The first forming roller apparatus 6 according to the embodiment includes a pair of rollers 61 and 62, a pair of air cylinders 64 and 65, and a load control device 66. The roller 61 is formed by a shaft portion 61*a* and a roller body 61*b* mounted around the shaft portion 61*a*. The roller 61 is a so-called upper roller that contacts the upper electrode surface, namely the filled surface, of the electrode surfaces of the filled electrode 5. The roller 62 is formed by a shaft portion 62*a* and a roller body 62*b* mounted around the shaft portion 62*a*. The roller 62 is a so-called lower roller that contacts an electrode surface of the filled electrode 5 that does not face the filler 4 (the lower electrode surface). The outer peripheral portion of each of the roller bodies 61*b* and 62*b* of the rollers 61 and 62 is formed by an elastic material.

Rubber may be used as the elastic material. Examples of the robber that may be used as the elastic material include SBR (styrene butadiene rubber), BR (butadiene rubber), IR (isoprene rubber), EPM (ethylene propylene rubber), EPDM (ethylene propylene diene rubber), NBR (nitrile rubber), chloroprene rubber, IIR (butyl rubber), urethane rubber, silicone rubber, polysulfide rubber, nitrile hydroxide rubber, fluoro rubber, tetrafluoroethylene propylene rubber, tetrafluoroethylene propylene vinylidene fluoride rubber, acrylic rubber, chlorosulfonated polyethylene rubber, epichlorohydrin rubber, ethylene acrylic rubber, liquid rubber, an olefinic thermoplastic elastomer, a urethane thermoplastic elastomer, a polyester thermoplastic elastomer, a polyamide thermoplastic elastomer, a vinyl chloride thermoplastic elastomer, and a fluorinated thermoplastic elastomer. The use of chloroprene rubber (neoprene rubber) makes the resulting roller bodies highly resistant to acids, and is therefore particular preferable. In the embodiment, the hardness of the outer peripheral portion of the roller body 61*b* of the upper roller 61 is lower than the hardness of the outer peripheral portion of the roller body 62*b* of the lower roller 62.

In the first forming roller apparatus 6 according to the embodiment, as shown in FIG. 3A, the gap between the upper roller 61 and the lower roller 62 is not constant. Specifically, an electrode width direction (also referred to as an electrode lateral direction herein and in the drawings) is defined as a direction perpendicular to a direction which is perpendicular to a transfer direction in which the filled electrode 5 is transferred and also perpendicular to the electrode surface. The gap between the upper roller 61 and the lower roller 62 becomes gradually wider from a first area of the electrode surface located on one side in the width direction [a left-side area of the electrode surface on the page of FIG. 3A] toward a second area of the electrode surface located on the other side in the width direction [a right-side area of the electrode surface on the page of FIG. 3A].

The air cylinder 64 pushes an end of the shaft portion 61*a* of the upper roller 61, which is located on the first area side, toward the filled electrode 5 in accordance with an output command from the load control device 6. The air cylinder 65 pushes an end of the shaft portion 61*a* of the upper roller 61, which is located on the second area side, toward the filled electrode 5 in accordance with an output command from the load control device 6. The load control device 66 outputs the output commands for driving and controlling the air cylinders 64 and 65 such that the load applied to the end of the shaft portion 61*a* located on the first area side [left side in FIG. 3A] is higher than the load applied to the end of the shaft portion 61*a* located on the second area side [right side in FIG. 3A].

Figure 3B:
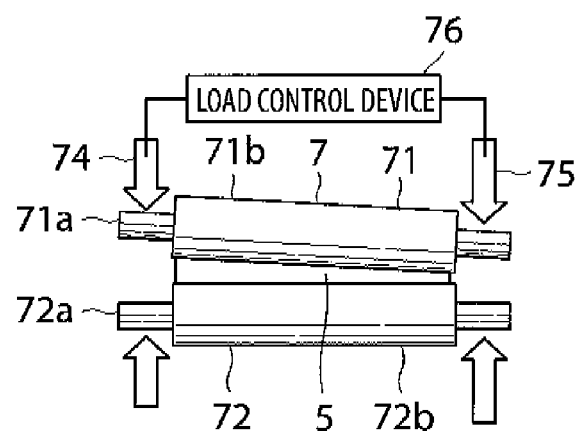

FIG. 3B schematically shows the configuration of the second forming roller apparatus 7. As shown in FIG. 3B, the second forming roller apparatus 7 according to the embodiment includes a pair of rollers 71 and 72, a pair of air cylinders 74 and 75, and a load control device 76. The configuration of the second forming roller apparatus 7 is the same as the configuration of the first forming roller apparatus 6, and thus is not described here. In the second forming roller apparatus 7, as shown in FIG. 3B, the gap between the upper roller 71 and the lower roller 72 becomes gradually narrower from a first area of the electrode surface located on one side in the width direction [an area on the left side as seen on the sheet surface of FIG. 3B] toward a second area of the electrode surface located on the other side in the width direction [a right-side area on the page of FIG. 3B]. In order to create this state, the load control device 76 of the second forming roller apparatus 7 outputs output commands for driving and controlling the air cylinders 64 and 65 such that the load applied to the end of a shaft portion 71*a* located on the second area side [right side in FIG. 3B] is higher than the load applied to the end of the shaft portion 71*a* located on the first area side [left side in FIG. 3B].

Figure 3C:
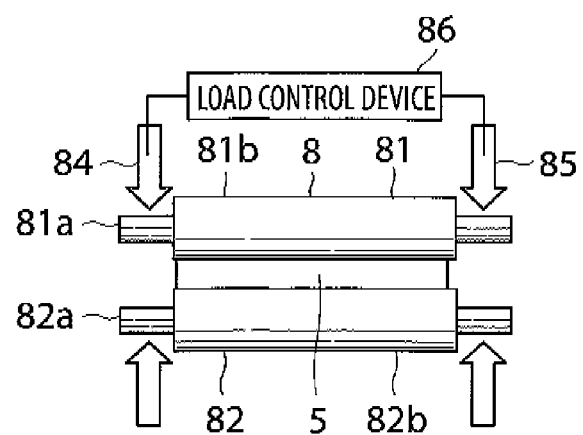

FIG. 3C schematically shows the configuration of the third forming roller apparatus 8. As shown in FIG. 3C, the third forming roller apparatus 8 includes a pair of rollers 81 and 82, a pair of air cylinders 84 and 85, and a load control device 86. The configuration of the third forming roller apparatus 8 is also the same as the configuration of the first forming roller apparatus 6 and the second forming roller apparatus 7, and thus is not described here. In the third forming roller apparatus 8, as shown in FIG. 3C, the gap between the upper roller 81 and the lower roller 82 is constant. The load control device 86 of the third forming roller apparatus 8 outputs output commands for driving and controlling the air cylinders 84 and 85 such that the loads applied to both of the ends of a shaft portion 81*a* are equal to each other.

In the embodiment, as shown in Table 1 below, the load control device 66 of the first forming roller apparatus 6 controls the loads such that the air cylinder 64 applies a maximum load to the end of the shaft portion 61a located on the side of the first area [area of the electrode surface on the left side in FIG. 3A] and the air cylinder 65 applies a minimum load (for example, zero) to the end of the shaft portion 61a located on the side of the second area [area of the electrode surface on the right side in FIG. 3A]. The load control device 76 of the second forming roller apparatus 7 controls the loads such that the air cylinder 74 applies a minimum load (for example, zero) to the end of the shaft portion 71a located on the side of the first area [area of the electrode surface on the left side in FIG. 3B] and the air cylinder 75 applies a maximum load to the end of the shaft portion 71a located on the side of the second area [area of the electrode surface on the right side in FIG. 3B]. The load control device 86 of the third forming roller apparatus 8 controls the loads such that the air cylinder 84 and the air cylinder 85 respectively apply a maximum load to the end of the shaft portion 81a located on the side of the first area [area of the electrode surface on the left side in FIG. 3C] and to the end of the shaft portion 81a located on the side of the second area [area of the electrode surface on the right side in FIG. 3C].

TABLE 1

| Process | Roller | Air cylinder on first area side | Air cylinder on second area side |
|---|---|---|---|
| 1 | First forming roller | Maximum load | Zero load |
| 2 | Second forming roller | Zero load | Maximum load |
| 3 | Third forming roller | Maximum load | Maximum load |

In the embodiment, the maximum load is achieved with the air cylinder applying a pressure of 0.5 MPa, and the minimum load, or zero load, is achieved with the air cylinder applying a pressure of 0 MPa so that no pressure is applied by air (only a pressure due to the own weight of the roller is applied). Controlling the loads in this way maximizes the flowability of the paste-like active material.

Next, a process in which the pressing apparatus 9 presses the electrode surface of the filled electrode 5 in the embodiment will be described. The filled electrode 5 transferred to the pressing apparatus 9 is first subjected to a first pressing step performed by the first forming roller apparatus 6. In the first pressing step, the first area of the electrode surface located on one side in the width direction of the electrode is intensively (mainly) pressed.

When the first pressing step is finished, the filled electrode 5 is subjected to a second pressing step performed by the second forming roller apparatus 7. In the second pressing step, the second area opposite to the first area is intensively (mainly) pressed.

When the second pressing step is finished, the filled electrode 5 is subjected to a third pressing step performed by the third forming roller apparatus 8. In the third pressing step, the first and second areas are pressed over their entirety.

In the first and second pressing steps, the paste-like active material fed to the filled electrode 5 flows in the width direction from the area which is intensively pressed toward the area which is not intensively pressed. Then, in the third pressing step which terminates the pressing step, the amount of the paste-like active material on the filled electrode 5 becomes substantially equal over the entire width of the filled electrode 5.

When the pressing step is performed in this way, portions of the elastic peripheral surface of the outer peripheral portion of each of the roller bodies 61b, 71b, and 81b of the upper rollers 61, 71, and 81 that contact the current collector 1 are concavely deformed by a pressure applied when such portions contact the upper electrode surface (filled surface) of the filled electrode 5. The remaining portions of each of the roller bodies 61b, 71b, and 81b that do not contact the current collector 1 are projected (engaged) inwardly of areas defined (surrounded) by the frame ribs 11 and the inner ribs 12 of the current collector 1. Thus, the paste-like active material is squeezed or forced from the filled surface toward the opposite surface. In the embodiment, in particular, the hardness of each of the roller bodies 61b, 71b, and 81b of the upper rollers 61, 71, and 81 is lower than the hardness of the roller bodies 62b, 72b, and 82b of the lower rollers 62, 72, and 82. That is, the outer peripheral portions of the roller bodies of the upper rollers are softer than the outer peripheral portions of the roller bodies of the lower rollers. Therefore, the gap formed between the inner ribs 12 and the outer peripheral portion of each of the roller bodies 62b, 62b, and 82b of the lower rollers 62, 72, and 82 can be made larger than the gap formed between the inner ribs 12 and the outer peripheral portion of each of the roller bodies 61b, 71b, and 81b of the upper rollers 61, 71, and 81. This allows the paste-like active material fed to the filled surface to flow to the lower surface of the electrode opposite to the filled surface. Thus, the inner ribs 12 of the current collector 1 can be sufficiently covered with the paste-like active material on the side opposite to the filled surface.

Rubber with a Shore hardness A of 40 may be used for the upper rollers, and rubber with a Shore hardness A of 60 may be used for the lower rollers, for example. The thickness of the rubber is preferably uniform so that no unintentional pressure is applied during pressing of the filled electrode, and is preferably 40 mm or more. Rubber with a thickness in this range can sufficiently squeeze or force the paste-like active material and transfer a pressure without a loss.

If there is a sufficient installation space, a plurality of the first forming roller apparatuses, a plurality of the second forming roller apparatus, and/or a plurality of the third forming roller apparatuses may be disposed in the transfer path, and may be arranged in any order. However, it is preferable that the third forming roller apparatus is disposed at the end of the row of roller apparatuses in the transfer direction.

Figure 4:
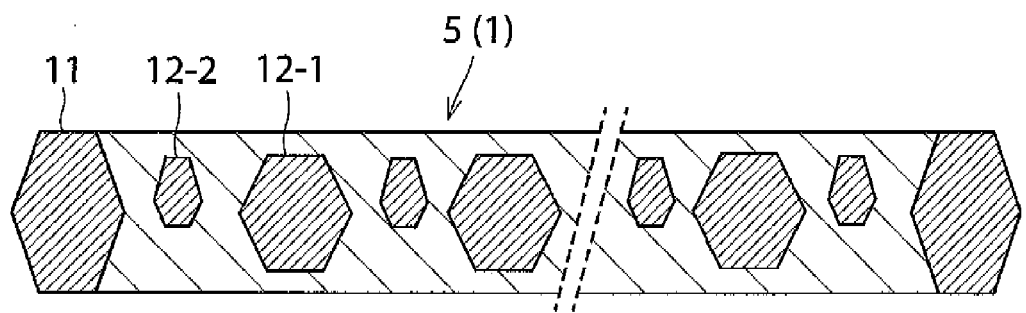
FIG. 4 is a cross-sectional view taken along the line A-A' of FIG. 2, showing a state in which the current collector of FIG. 2 is filled with a paste-like active material.

FIG. 4 is a cross-sectional view taken along the line A-A' of FIG. 2. In the embodiment, as shown in FIG. 4, the inner ribs (12-1, 12-2) of the current collector 1 are formed to be thinner than the frame rib 11, and the geometry of the inner ribs (12-1, 12-2) disposed inside the frame rib 11 is determined such that the inner ribs (12-1, 12-2) are located more inward than two imaginary planes each including both end surfaces of the frame rib 11 in the thickness direction. This makes it possible to form a gap not only between the outer peripheral surface of each of the roller bodies 61b, 71b, and 81b of the upper rollers 61, 71, and 81 and the inner ribs (12-1, 12-2) but also between the outer peripheral surface of each of the roller bodies 62b, 72b, and 82b of the lower rollers 62, 72, and 82 and the inner ribs (12-1, 12-2) when the filled electrode 5 passes through the first to third forming roller apparatuses 6 to 8, which facilitates the flow of the paste-like active material. As a result, end surfaces of the inner ribs (12-1, 12-2) of the current collector 1 can be further favorably covered with the paste-like active material particularly on the lower surface side of the filled electrode 5.

There may not necessarily be a gap formed between the outer peripheral surface of each of the roller bodies 61*b*, 71*b*, and 81*b* of the upper rollers 61, 71, and 81 and the thick inner ribs (12-1).

EXAMPLES

Example 1

1.6% by mass of tin and 0.08% by mass of calcium were added to lead to obtain a total of 100% by mass of a lead alloy mixture, which was melted and subjected to a gravity die casting process to fabricate a current collector for a positive electrode. As shown in FIGS. 3 and 4, the current collector 1 had thick inner ribs 12-1 and thin inner ribs 12-2 provided inside the frame rib 11. The external dimensions of the frame rib 11 were 385 mm×140 mm, and the thickness and the width of each of the frame rib 11 were respectively 5.8 mm and 4.4 mm. Each of the thick inner ribs 12-1 had a cross-sectional shape of a hexagon with a thickness larger than its width, the thickness being 5.4 mm and the width being 4.3 mm. Each of the thin inner ribs 12-2 also had a cross-sectional shape of a hexagon with a thickness larger than its width, the thickness being 3.6 mm and the width being 2.8 mm. As shown in FIG. 4, one end surfaces of the thick inner ribs 12-1 and the thin inner ribs 12-2 on the side of the filled surface in the thickness direction were located on an identical imaginary plane. The one end surfaces of the thick inner ribs 12-1 and the thin inner ribs 12-2 were disposed to face upward when the paste-like active material was fed. The difference in the thickness direction between the other end surface of the frame rib 11 and the other end surfaces of the thick inner ribs 12-1 on a side of the lower surface of the current corrector was 0.2 mm. The lower surface is opposite to the filled surface.

The current collector 1 described above was filled with the paste-like active material using the method and the apparatus according to the embodiment described above with reference to FIGS. 1 and 2 to manufacture a filled electrode 5. That is, the current collector 1 was filled with the paste-like active material when the current collector 1 passed through the filler 4 to form the filled electrode 5. The filled electrode 5 was transferred to the pressing apparatus 9 to be subjected to the pressing step. In the pressing step, rollers with a peripheral surface made of a rubber material were used as the upper rollers 61, 71, and 81 and the lower rollers 62, 72, and 82 of the first to third forming roller apparatuses 6 to 8. The rubber material for the upper rollers was neoprene rubber (Shore hardness A: 40) with a thickness of 40 mm. The rubber material for the lower rollers was neoprene rubber (Shore hardness A: 60) with a thickness of 40 mm. The air cylinder 64 and the air cylinder 65 of the first forming roller apparatus 6 were caused to produce pressing forces of 0.5 MPa and 0 MPa, respectively. The air cylinder 74 and the air cylinder 75 of the second forming roller apparatus 7 were caused to produce pressing forces of 0 MPa and 0.5 MPa, respectively. The air cylinders 84 and 85 of the third forming roller apparatus 8 were each caused to produce a pressing force of 0.5 MPa.

The first forming roller apparatus 6 caused the paste-like active material on the filled electrode 5 to flow toward the lower surface opposite to the filled surface and. At the same time, the first forming roller apparatus 6 caused the paste-like active material to flow from the area corresponding to the air cylinder 64, which generated a large pressing force, toward the area corresponding to the air cylinder 65, which generated a small pressing force. A portion of the roller body 61*b* of the upper roller 61 that did not contact the frame rib 11 of the current collector 1 was fitted into a space surrounded by the frame rib 11 because of the elasticity of the rubber material. The degree of fitting at the area corresponding to the air cylinder 64 was greater than the degree of fitting at the area corresponding to the air cylinder 65, which caused the paste-like active material to flow. Next, in the pressing performed by the second forming roller apparatus 7, contrary to the pressing performed by the first forming roller apparatus 6, the fitting condition of the portion of the roller body 71*b* of the roller 71 into the internal space surrounded by the frame rib 11 is greater at the area corresponding to the air cylinder 75 than at the area corresponding to the air cylinder 74. Thus, the paste-like active material is caused to flow in the opposite direction to the flow caused by the first forming roller apparatus 6. The air cylinder 84 and the air cylinder 85 of the third forming roller apparatus 8 were caused to produce the same pressing force, which made the paste-like active material on the filled electrode 5 substantially uniform.

Comparative Example 1

In the pressing step of Example 1 described above, the first forming roller apparatus 6 and the second forming roller apparatus 7 were omitted so that the filled electrode 5 was pressed using only the third forming roller apparatus 8. The process for Comparative Example 1 was otherwise the same as that for Example 1.

Figure 5:
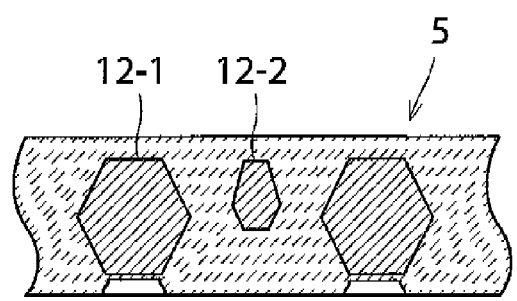
FIG. 5 is an explanatory cross-sectional view showing a state in which thick inner ribs are exposed to the lower surface side of an electrode.

The electrode manufactured in accordance with Example 1 described above and the electrode manufactured in accordance with Comparative Example 1 were checked on the lower surface opposite to the filled surface to which the paste-like active material was fed. In the electrode according to Example 1, both the thick inner ribs 12-1 and the thin inner ribs 12-2 were reliably buried or embedded in the active material (see FIG. 4). In the electrode according to Comparative Example 1, on the other hand, it was found that the filling performance of the active material was insufficient, and that the thick inner ribs 12-1 were partly exposed to the surface opposite to the filled surface. FIG. 5 shows a state in which the thick inner ribs 12-1 are exposed. If the frame rib is thick (5.8 mm) and the thick inner rib are thick (5.4 mm), the lower surface opposite to the filled surface can be filled with the paste-like active material in the embodiment of the present invention.

INDUSTRIAL APPLICABILITY

According to the present invention, before the fed paste-like active material is hardened, an electrode surface is pressed with pressing pressure changing along the width direction of the electrode which is perpendicular to the direction in which the electrode is transferred, in order to cause the paste-like active material to flow. As the result, it is possible to manufacture an electrode in which inner ribs of a current collector is favorably covered with a paste-like active material on the lower surface side of the electrode.

DESCRIPTION OF REFERENCE NUMERALS

1: current collector
2: belt conveyor
3: hopper
4: filler
5: electrode
6: first forming roller apparatus
7: second forming roller apparatus
8: third forming roller apparatus
9: pressing apparatus
11: frame rib
12: inner rib

The invention claimed is:

1. A method for manufacturing a paste-type electrode of lead-acid battery, comprising the steps of:
    filling a current collector with a paste-like active material to obtain a filled electrode when the current collector passes below a filler including a hopper for containing the paste-like active material; and
    pressing an electrode surface of the filled electrode during transfer of the filled electrode before the paste-like active material of the filled electrode is hardened, wherein:
    the pressing step comprises:
        a first pressing step of intensively pressing a first area of the electrode surface located on one side in a width direction that is perpendicular to a transfer direction in which the filled electrode is transferred and a perpendicular direction that is perpendicular to the electrode surface;
        a second pressing step of intensively pressing a second area of the electrode surface located on the other side in the width direction; and
        a third pressing step of pressing the first and second areas of the electrode surface over the entire width of the filled electrode, wherein:
    the first to third pressing steps are each performed at least once; and
    the pressing step is terminated by the third pressing step.

2. The method for manufacturing a paste-type electrode of lead-acid battery according to claim 1, wherein:
    the press load on the first area is higher than the press load on the second area in the first pressing step;
    the press load on the second area is higher than the press load on the first area in the second pressing step; and
    the press loads on the first and second areas are equal to each other in the third pressing step.

3. The method for manufacturing a paste-type electrode of lead-acid battery according to claim 2, wherein:
    the first to third pressing steps are respectively performed by first to third forming roller apparatuses each including a pair of rollers disposed to interpose the filled electrode in the perpendicular direction and to transfer the filled electrode in the transfer direction;
    the first forming roller apparatus is configured such that the gap between the pair of rollers becomes gradually wider from the first area toward the second area of the electrode surface;
    the second forming roller apparatus is configured such that the gap between the pair of rollers becomes gradually narrower from the first area toward the second area of the electrode surface; and
    the third forming roller apparatus is configured such that the gap between the pair of rollers is constant.

4. An apparatus for manufacturing a paste-type electrode of lead-acid battery, comprising:
    a belt conveyor that sequentially transfers a current collector placed thereon;
    a filler including a hopper for containing a paste-like active material to fill the current collector that passes below the filler with the paste-like active material to provide a filled electrode; and
    a pressing apparatus disposed behind the belt conveyor in a transfer direction in which the belt conveyor transfers the filled electrode to press an electrode surface of the filled electrode, wherein:
    the pressing apparatus comprises:
        at least one first forming roller apparatus that intensively presses a first area of the electrode surface located on one side in a width direction that is perpendicular to the transfer direction and a perpendicular direction that is perpendicular to the electrode surface;
        at least one second forming roller apparatus that intensively presses a second area of the electrode surface located on the other side in the width direction; and
        at least one third forming roller apparatus that presses the first and second areas of the electrode surface over the entire width of the filled electrode; and
    the third forming roller apparatus is disposed at the end of a row of the first to third forming roller apparatuses arranged in the transfer direction.

5. The apparatus for manufacturing a paste-type electrode of lead-acid battery according to claim 4, wherein:
    the first to third forming roller apparatuses each include a pair of rollers disposed to interpose the filled electrode in the perpendicular direction and to transfer the filled electrode in the transfer direction;
    the first forming roller apparatus is configured such that the gap between the pair of rollers becomes gradually wider from the first area toward the second area of the electrode surface;
    the second forming roller apparatus is configured such that the gap between the pair of rollers becomes gradually narrower from the first area toward the second area of the electrode surface; and
    the third forming roller apparatus is configured such that the gap between the pair of rollers is constant.

6. The apparatus for manufacturing a paste-type electrode of lead-acid battery according to claim 5, wherein
    an outer peripheral portion of at least one roller in the pair of rollers of each of the first to third forming roller apparatuses is formed by an elastic material, the at least one roller contacting an electrode surface of the filled electrode that faces the filler.

7. The apparatus for manufacturing a paste-type electrode of lead-acid battery according to claim 6, wherein:
    the first to third forming roller apparatuses each include a load control device that controllably applies a load in a direction toward the filled electrode to each of ends of a rotary shaft of the at least one roller;
    the load control device of the first forming roller apparatus controls the loads such that the load applied to the end of the rotary shaft located on the first area side is higher than the load applied to the end of the rotary shaft located on the second area side;
    the load control device of the second forming roller apparatus controls the loads such that the load applied to the end of the rotary shaft located on the second area side is higher than the load applied to the end of the rotary shaft located on the first area side; and
    the load control device of the third forming roller apparatus controls the loads such that the loads applied to both of the ends of the rotary shaft are equal to each other.

8. The apparatus for manufacturing a paste-type electrode of lead-acid battery according to claim 7, wherein:
    the load control device of each of the first and second forming roller apparatuses controls the loads such that a maximum load is applied to one of the ends of the rotary shaft and a minimum load is applied to the other of the ends of the rotary shaft; and
    the load control device of the third forming roller apparatus controls the loads such that a maximum load is applied to each of the ends of the rotary shaft.

9. The apparatus for manufacturing a paste-type electrode of lead-acid battery according to claim 6, wherein:

the outer peripheral portion of the other roller in the pair of rollers of each of the first to third forming roller apparatuses is also formed by an elastic material; and the hardness of the outer peripheral portion of the one roller is lower than the hardness of the outer peripheral portion of the other roller.

10. The apparatus for manufacturing a paste-type electrode of lead-acid battery according to claim 6, wherein the elastic material forming the outer peripheral portion of the one roller has a thickness of 40 mm or more.

11. The apparatus for manufacturing a paste-type electrode of lead-acid battery according to claim 4, wherein the current collector includes a frame rib and an inner rib unitarily formed with the frame rib and dividing a space inside the frame rib into a plurality of small spaces, at least an end surface of the inner rib in a thickness direction that does not face the filler being located more inward than an imaginary plane including an end surface of the frame rib in the thickness direction that does not face the filler.

* * * * *